United States Patent
Kim (10) Patent No.: US 11,187,361 B2
(45) Date of Patent: Nov. 30, 2021

(54) PIPE COUPLER HAVING FUNCTION OF COVERING PIPE

(71) Applicant: Byung Sub Kim, Gwangju (KR)

(72) Inventor: Byung Sub Kim, Gwangju (KR)

( * ) Notice: Subject to any disclaimer, the term of this patent is extended or adjusted under 35 U.S.C. 154(b) by 141 days.

(21) Appl. No.: 16/574,993

(22) Filed: Sep. 18, 2019

(65) Prior Publication Data

US 2020/0011466 A1    Jan. 9, 2020

Related U.S. Application Data (63) Continuation of application No. PCT/KR2017/014319, filed on Dec. 7, 2017.

(30) Foreign Application Priority Data

Jun. 9, 2017    (KR) .................. 10-2017-0072397

(51) Int. Cl.
*F16L 37/092*    (2006.01)
*F16L 57/00*    (2006.01)

(52) U.S. Cl.
CPC ........... *F16L 37/0927* (2019.08); *F16L 57/00* (2013.01)

(58) Field of Classification Search
CPC ... F16L 37/0925; F16L 37/0927; F16L 17/02; F16J 15/20; F16J 15/32
See application file for complete search history.

(56) References Cited

U.S. PATENT DOCUMENTS

| | | | | |
|---|---|---|---|---|
| 4,431,216 A | * | 2/1984 | Legris ................. | F16L 37/0925 285/104 |
| 6,517,124 B1 | * | 2/2003 | Le Quere ........... | F16L 37/0915 285/340 |
| 6,964,436 B2 | * | 11/2005 | Le Quere ............. | F16L 37/091 285/307 |

FOREIGN PATENT DOCUMENTS

| | | | | |
|---|---|---|---|---|
| EP | 0579194 A1 | * | 1/1994 | ......... F16L 37/0927 |
| JP | 2001221386 A | * | 8/2001 | ......... F16L 37/0926 |
| KR | 10-2007-0107412 A | | 11/2007 | |
| KR | 10-2008-0074033 A | | 8/2008 | |
| KR | 10-1403332 B1 | | 6/2014 | |
| KR | 10-1506467 B1 | | 3/2015 | |
| KR | 10-1674949 B1 | | 11/2016 | |

OTHER PUBLICATIONS

International Search Report issued in PCT/KR2017/014319; dated Mar. 30, 2018.

\* cited by examiner

*Primary Examiner* — Matthew Troutman
*Assistant Examiner* — Alexander T Rufrano
(74) *Attorney, Agent, or Firm* — Studebaker & Brackett PC (57) ABSTRACT

A pipe coupler having a function of covering a pipe. The pipe coupler includes a coupler main body having a hollow, a grip ring provided in the hollow and configured to fix the pipe so as to allow the pipe to be inserted thereinto and prevent the inserted pipe from coming out, and a packing member provided in the hollow, and configured to seal a gap between the coupler main body and the pipe when the pipe is inserted into the packing member. The packing member includes a pipe locking protrusion protruding inward from an inner surface of a lower end portion thereof so that a front end portion of the pipe inserted into the packing member is surrounded and covered. The pipe coupler can prevent a coating layer of a pipe from being peeled from a tip of the pipe.

6 Claims, 6 Drawing Sheets

FIG. 1

--Prior Art--

PIPE COUPLER HAVING FUNCTION OF COVERING PIPE

CROSS-REFERENCE TO RELATED APPLICATIONS

The present application is a continuation of International Patent Application No. PCT/KR2017/014319, filed Dec. 7, 2017, which is based upon and claims the benefit of priority to Korean Patent Application No. 10-2017-0072397, filed on Jun. 9, 2017. The disclosures of the above-listed applications are hereby incorporated by reference herein in their entirety.

TECHNICAL FIELD

The present invention relates to a pipe coupler having a function of covering a pipe, and more specifically, to a pipe coupler having a function of covering a pipe which includes a pipe locking protrusion formed on a packing member so that a front end portion of the pipe is surrounded and covered so as to prevent a coating layer from peeling off from a front end portion of a pipe, which is coated with the coating layer, due to a pressure of a continuously applied fluid, can allow the pipe having a non-smooth and grooved outer circumferential surface to be sealed, and can more firmly maintain watertightness and airtightness using a pair of packing members that act as a swash cam when the pipe is inserted.

BACKGROUND ART

Piping work commonly refers to the work of forming a pipeline by cutting a pipe, which is manufactured in a predetermined length, into a plurality of pieces according to an installation environment and connecting the cut pipes, and a pipe coupler has been used for the piping work due to a limited length of the pipe and necessity of changing positions of the pipelines.

A conventional pipe coupler used as the pipe coupler has the same inner diameter as a pipe to be connected and a greater outer diameter than the pipe and includes a plurality of connectors that have spiral grooves formed therein so that the pipe is threadedly inserted into the pipe coupler.

However, since the pipe is inserted into the pipe coupler by rotating, the conventional typical pipe coupler has a problem of low workability.

To solve the problem of the conventional typical pipe coupler, a pipe connector with a packing member is disclosed in Korean Utility Model Registration No. 0381922 (Registered on Apr. 7, 2005).

Figure 1:
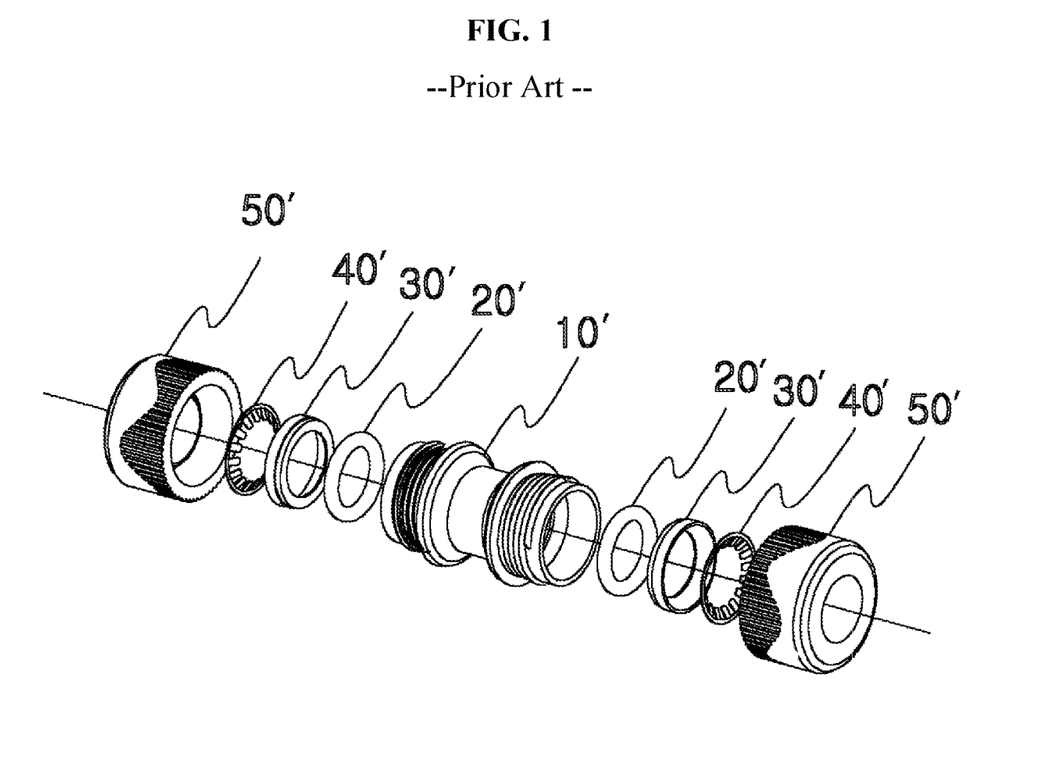
FIG. 1 is an exploded perspective view of a pipe coupler according to the related art.

FIG. 1 shows a pipe coupler according to the related art disclosed in Korea Utility Model Registration No. 0381922.

Referring to FIG. 1, the pipe coupler according to the related art includes a body 10' which is hollow and has a plurality of connectors that are open so that a pipe to be connected is inserted thereinto, a packing member 20' which is installed on an inner end portion of the connector and ensures the airtightness of the pipe connected with the body 10', a support ring 30' which is inserted into the connector, comes into close contact with the packing member 20', and has an inclined surface formed on an upper portion thereof so that an inner surface thereof is tapered downward, a fixing part 40' which is installed on and comes into close contact with the inclined surface of the support ring 30' and includes a plurality of fixing pieces that are inserted into the connector, are press-fitted to an outer circumferential surface of the pipe to be connected, and fix the pipe, and a locking nut 50' which has a threaded groove formed on an inner side thereof, is threadedly fastened to an inner end of the connector, and comes into close contact with and is fixed to the fixing part 40', wherein the body 10', the packing member 20', the support ring 30', the fixing part 40', and the locking nut 50' are sequentially installed.

However, in the pipe coupler according to the related art, since a front end portion of the pipe is exposed to a fluid flowing in the pipe coupler, the coating layer, which is coated to the pipe, is peeled from an external surface of the pipe by a continuously applied pressure of the fluid, and thus the front end portion of the pipe corrodes.

Further, in the pipe coupler according to the related art, since the pipe has grooves formed on an outer circumferential surface thereof at regular intervals in a circumferential direction so that a fluid moves along the grooves, packing is not performed appropriately, and thus there is a disadvantage in which the pipe should be used after a groove formed in a connection portion is filled with a bonding material or the like.

Further, in the case of the pipe coupler according to the related art, only an O-ring is shown as an example of the packing member 20', but the O-ring has a limitation in maintaining watertightness or airtightness due to a limitation of volume change due to elasticity.

Further, in the case of the pipe coupler according to the related art, when a force is applied to the pipe in a direction in which the pipe comes out (toward the front side of the hollow), radial pieces formed in the fixing part 40' are bent toward the front side of the hollow and excessively dig into the pipe, and thus the pipe is damaged.

Technical Problem

The present invention is directed to providing a pipe coupler having a function of covering a pipe which prevents a coating layer from peeling from a front end portion of the pipe, which is coated with the coating layer, due to a pressure of a fluid and allows the pipe, which even has a non-smooth and grooved outer circumferential surface, to be sealed.

The present invention is also directed to providing a pipe coupler having a function of covering a pipe which can more firmly maintain the watertightness and airtightness of a joint or gap between pipes.

Technical Solution

One aspect of the present invention provides a pipe coupler having a function of covering a pipe which connects pipes in which a fluid with a predetermined pressure moves while maintaining watertightness or airtightness, the pipe coupler including a coupler main body having a hollow formed in a length direction thereof and configured to communicate with the pipe, wherein the pipe is inserted into a front side of the hollow, a grip ring provided in the hollow of the coupler main body and configured to fix the pipe so as to allow the pipe to be inserted thereinto and prevent the inserted pipe from coming out, and a packing member provided in the hollow of the coupler main body and made of an elastic material to seal a gap between the coupler main body and the pipe when the pipe is inserted into the packing member, wherein the packing member includes a pipe locking protrusion protruding inward from an inner surface of a lower end portion thereof so that a front end portion of the pipe inserted into the packing member is surrounded and covered.

The packing member may include a first packing member having the pipe locking protrusion formed therein and an inner surface, which is in contact with the pipe, and a second packing member having an inner surface which is in contact with an outer surface of the first packing member and an outer surface which is in contact with the coupler main body, the pipe coupler may further include a packing support that is provided in the hollow of the coupler main body, has a fluid passage hole that is formed in the center thereof so that the fluid passes therethrough, and supports a rear end portion of the second packing member to prevent the second packing member from moving toward a rear side of the hollow, wherein the first packing member and the second packing member respectively include a first swash cam surface and a second swash cam surface formed to be inclined at contact surfaces thereof to correspond to each other, and thus, when the pipe is inserted into the first packing member by an external force and is caught by the pipe locking protrusion so that the first packing member is moved toward the rear side of the hollow with the pipe, the first packing member is contracted so that an inner surface thereof is pressed against the pipe, and the second packing member is expanded so that an outer surface thereof is pressed against the coupler main body.

The packing support may include a plurality of fluid inlet holes formed in a surface, on which the second packing member is supported so that the second packing member is moved toward the front side of the hollow by a pressure of a fluid in the coupler main body, and configured to communicate with the fluid passage hole.

The second packing member may include a fluid pressure groove which is formed in a rear end portion supported on the packing support and concave so that the fluid is introduced thereinto.

A packing inner diameter-maintaining ring having a hollow cylindrical shape may be fastened to an inner surface of a lower end of the first packing member so that an initial inner diameter of a part of the lower end portion of the first packing member is maintained even when the first packing member is contracted.

The grip ring may include a ring part, which is annular and allows the pipe to pass through the center thereof, and a plurality of radial pieces disposed to be inclined from the ring part in a direction, in which an inner diameter is decreased toward the rear side of the hollow, to allow the pipe to be inserted but not to come out toward the front side of the hollow, and the pipe coupler having a function of covering a pipe according to the present invention may further include a grip ring support including a ring support part, which is provided in the hollow of the coupler main body, positioned in front of the grip ring, and supports the ring part of the grip ring, and a radial piece support part which is bent from the ring support part toward the rear side of the hollow to correspond to an inclination of the radial piece of the grip ring so as to prevent the radial piece of the grip ring from being bent toward the front side of the hollow.

The pipe coupler having a function of covering a pipe according to the present invention may further include a pipe insertion guide which guides the insertion movement of the pipe, wherein the pipe insertion guide is provided in the hollow of the coupler main body, is positioned between the grip ring and the packing member so that the pipe is inserted thereinto, and has a predetermined inner diameter corresponding to an outer diameter of the pipe.

Advantageous Effects

A pipe coupler having a function of covering a pipe according to the present invention includes a pipe locking protrusion formed on a packing member so that a front end portion of the pipe is surrounded and covered so as to prevent a coating layer from peeling off from a front end portion of a pipe, which is coated with the coating layer, due to a continuously applied fluid pressure, and can allow the pipe, which even has a non-smooth and grooved outer circumferential surface, to be sealed.

Further, the pipe coupler having a function of covering a pipe according to the present invention can more firmly maintain watertightness and airtightness using a pair of packing members that function as a swash cam when the pipe is inserted.

Further, the pipe coupler having a function of covering a pipe according to the present invention includes a grip ring support which has a radial piece support, which is formed in front of the grip ring and bent toward a rear side of the hollow to correspond to an inclination of the radial piece so as to prevent the radial pieces from being bent toward a front side of the hollow when a force is applied to a direction in which the pipe comes out (toward the front side of the hollow), and thus damage to the pipe when the radial piece excessively digs into the pipe can be prevented.

<BRIEF DESCRIPTION OF MAIN SYMBOLS>

P: PIPE
10: COUPLER MAIN BODY
20: GRIP RING
30: PACKING MEMBER
40: PACKING SUPPORT
50: GRIP RING SUPPORT
60: PIPE INSERTION GUIDE

DETAILED DESCRIPTION

Hereinafter, a wedge-sealing type one-touch pipe coupler according to the present invention will be described in more detail with reference to the embodiments shown in the drawings.

Figure 2:
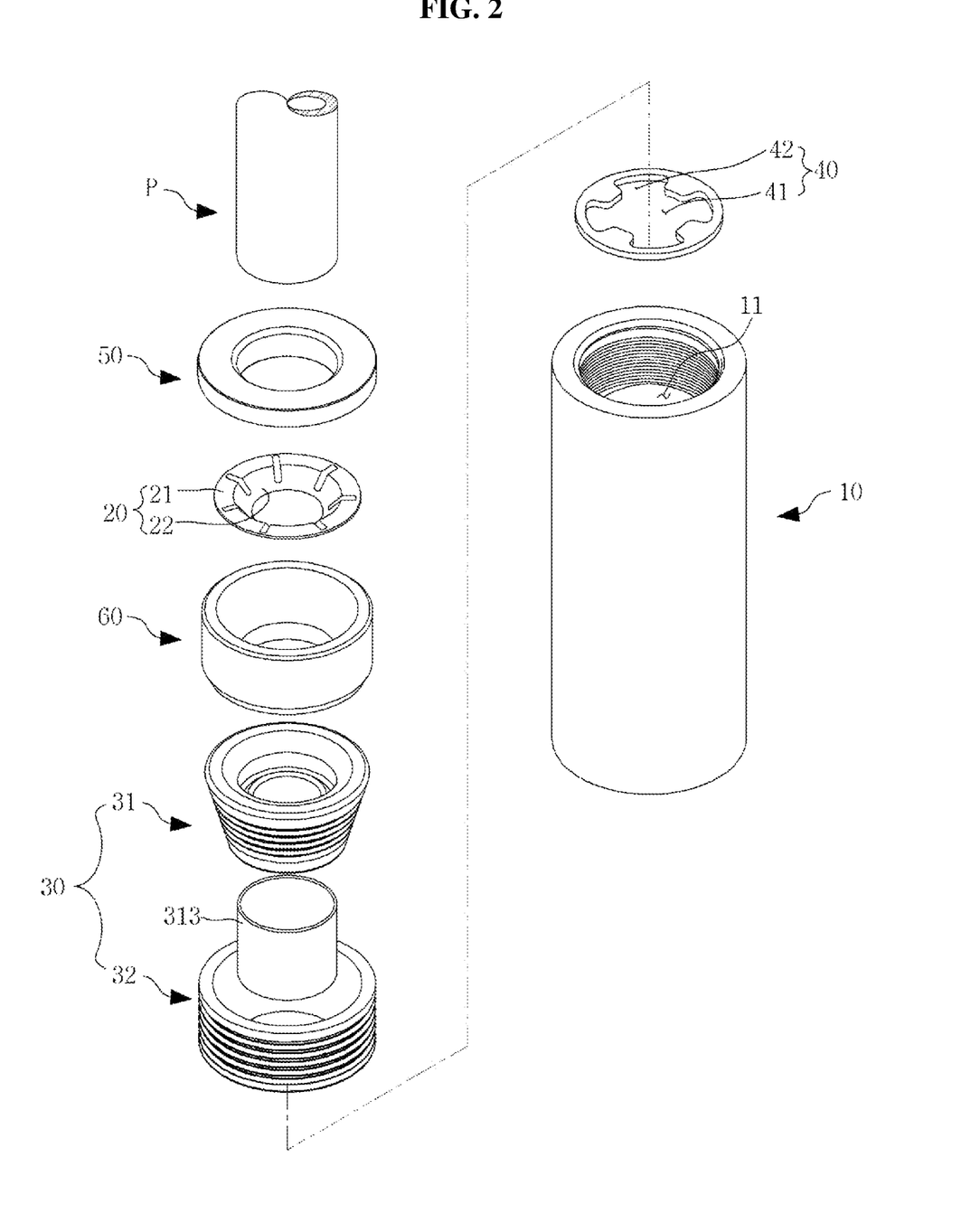
FIG. 2 is an exploded perspective view of a pipe coupler having a function of covering a pipe according to one embodiment of the present invention.
Figure 3A:
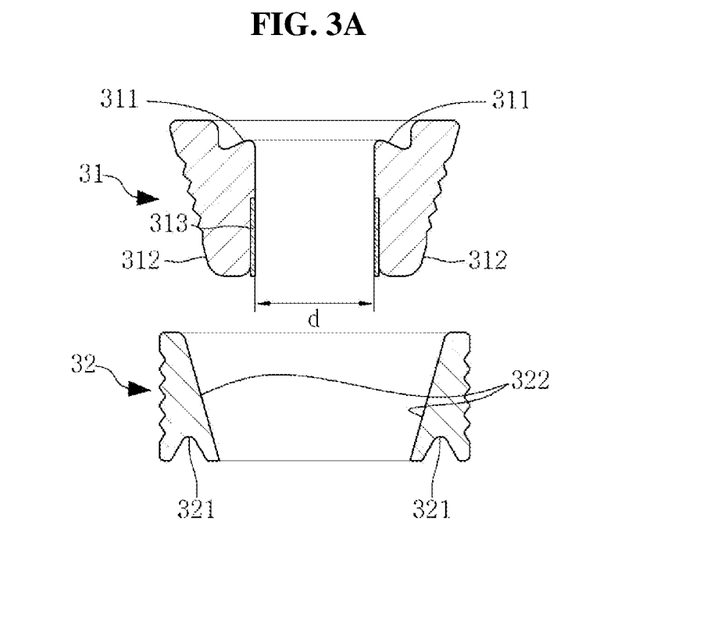
FIGS. 3A and 3B are exploded cross-sectional views of a packing member according to one embodiment of the present invention and a cross-sectional view illustrating an operational state of the packing member.
Figure 3B:
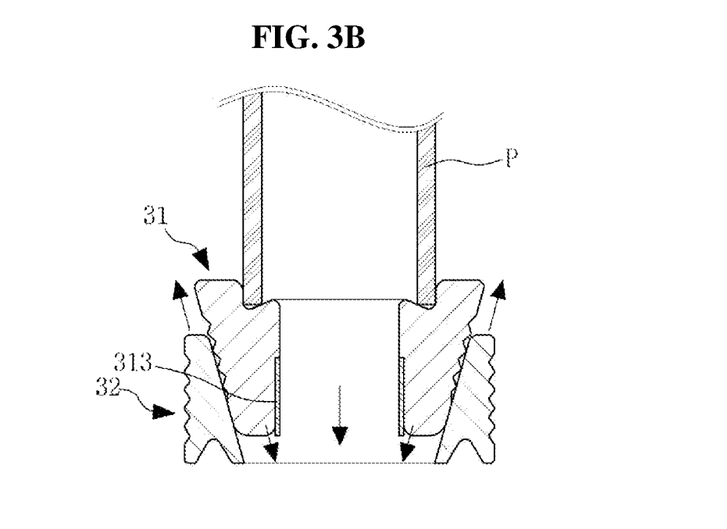
Figure 4:
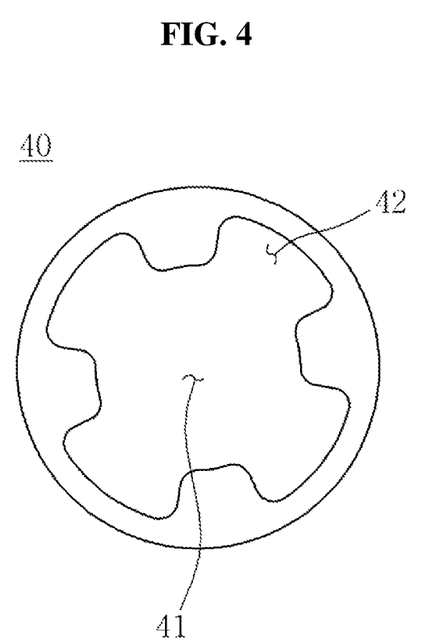
FIG. 4 is a plan view of a packing support according to one embodiment of the present invention.
Figure 5:
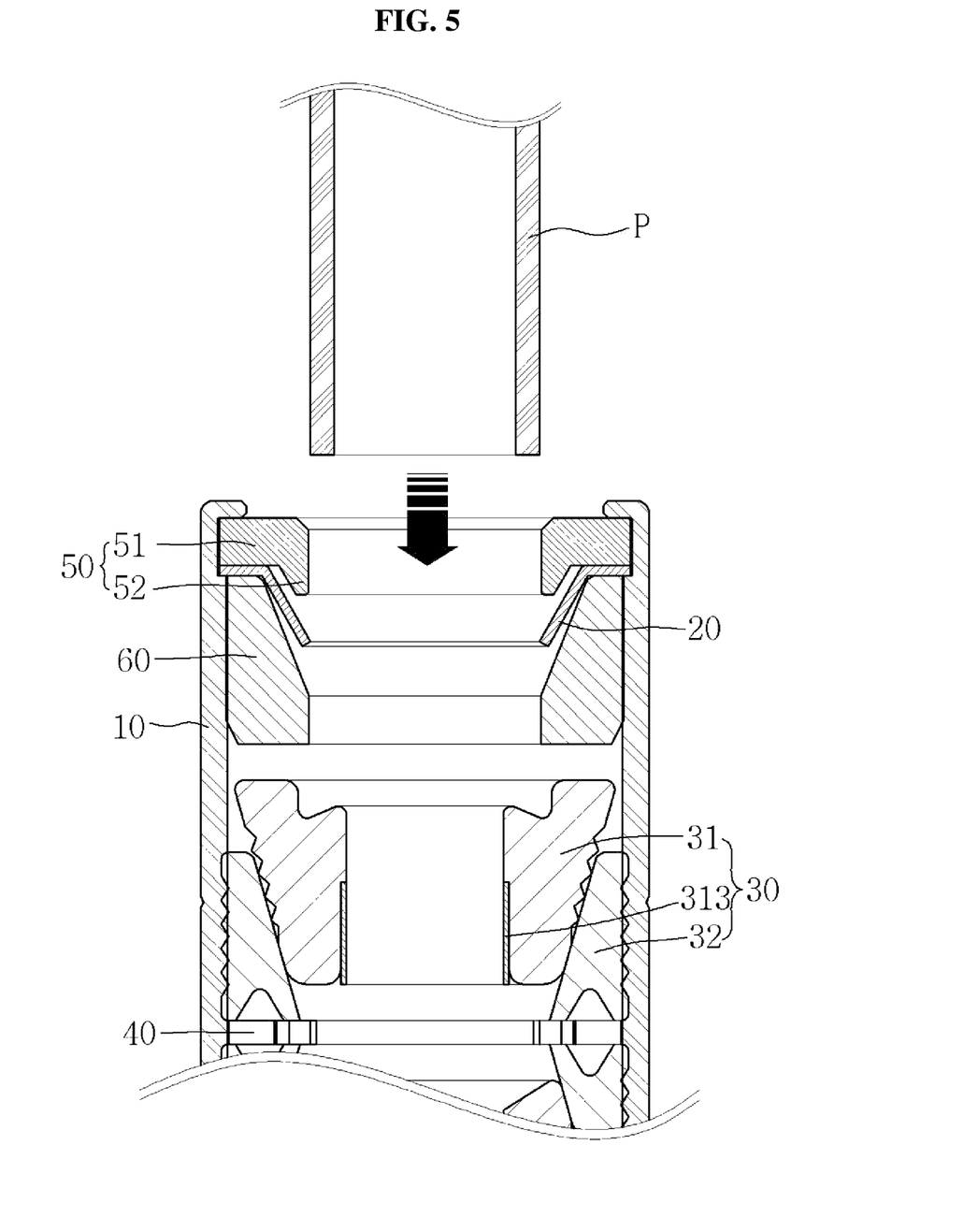
FIGS. 5 and 6 are cross-sectional views illustrating a use state of the pipe coupler having a function of covering a pipe according to one embodiment of the present invention.
Figure 6:
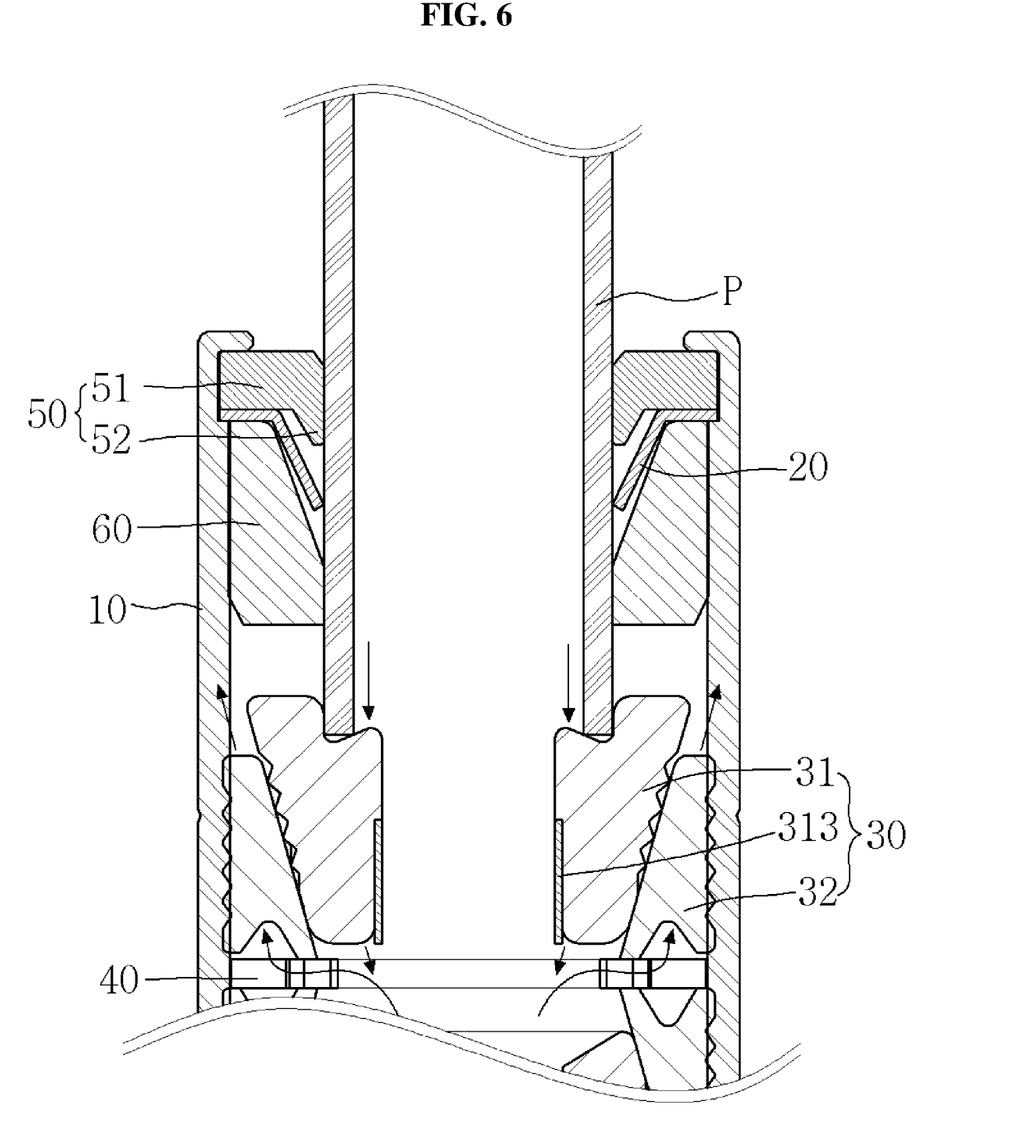

FIG. 2 is an exploded perspective view of a pipe coupler having a function of covering a pipe according to one embodiment of the present invention, FIGS. 3A and 3B are exploded cross-sectional views of a packing member according to one embodiment of the present invention and a cross-sectional view illustrating an operational state of the packing member, FIG. 4 is a plan view of a packing support according to one embodiment of the present invention, and FIGS. 5 and 6 are cross-sectional views of a use state of the pipe coupler having a function of covering a pipe according to one embodiment of the present invention.

Referring to FIGS. 2 to 6, the pipe coupler having a function of covering a pipe according to one embodiment of the present invention connects pipes, in which a fluid with a predetermined pressure moves, while maintaining water-tightness or airtightness and includes a coupler main body 10, a grip ring 20, a packing member 30, a packing support 40, a grip ring support 50, and a pipe insertion guide 60.

The coupler main body 10 includes a hollow 11 formed in a length direction at a position at which the pipe P for connection is inserted, wherein the pipe P is inserted into a front side of the hollow 11, and the hollow 11 communicates with the pipe P.

In one embodiment of the present invention, although the coupling main body 10 is shown as allowing the pipe P to be inserted into one side of the hollow 11 thereof, it may be manufactured in various shapes, such as a T-shape or a cross-shape, which, of course, are shapes in which the pipes P are inserted into both sides of the hollow 11.

The grip ring 20 is provided in the hollow 11 of the coupler main body 10 and may fix the pipe P so that the pipe P is inserted into the hollow 11 but the inserted pipe P does not come out.

In one embodiment of the present invention, the grip ring 20 includes an annular ring part 21, in which the pipe passes through the center thereof, and a plurality of radial pieces 22 is disposed to be inclined in a direction, in which an inner diameter is decreased toward a rear side of the ring part 21, so that the pipe P is insertable thereinto but does not come out toward the front side of the hollow.

That is, since the plurality of the radial pieces 22 allow the pipe P to be easily inserted but not to come out, the pipe P is fastened and fixed to the coupler main body 10 in an one-touch manner, wherein the plurality of radial pieces 22 are disposed to be inclined in a direction in which an inner diameter is decreased toward the rear side of the ring part 21.

Meanwhile, in the case of the radial pieces 22, when an external force is applied to a direction in which the inserted pipe P comes out, the radial pieces 22 move with the pipe P, are bent toward the front side of the hollow, and dig into the pipe P. In some cases, the radial pieces 22 may excessively dig into the pipe P so that the pipe P may be damaged, but in one embodiment of the present invention, the grip ring support 50, which will be described below, is provided to prevent this problem.

The packing member 30 is provided in the hollow 11 of the coupler main body 10 and made of an elastic material so as to seal a gap between the coupler main body 10 and the pipe P when the pipe P is inserted into the packing member 30

In one embodiment of the present invention, the packing member 30 includes a first packing member 31 and a second packing member 32.

The first packing member 31 includes a pipe locking protrusion 311 that protrudes inward from an inner surface of a lower end portion thereof so that a front end portion of the pipe P that is inserted into the first packing member 31 is surrounded and covered, and an inner surface of the first packing member 31 comes into contact with the pipe.

When the pipe P is coated with the coating layer, the pipe locking protrusion 311 prevents the coating layer from peeling from the front end portion of the pipe P due to a continuously applied pressure of a fluid, and since the front end portion of the pipe P is sealed, it is possible to seal even a pipe which even has a non-smooth and grooved outer circumferential surface.

Further, when the pipe P is inserted by an external force, the pipe P is caught by the pipe locking protrusion 311, and the first packing member 31 is moved with the pipe P toward a rear side of the hollow.

An inner surface of the second packing member 32 comes into contact with an outer surface of the first packing member 31, an outer surface comes into contact with the coupling main body 10, and a fluid pressure groove 321 is formed in a rear end portion, which is supported on the packing support 40 to be described later, to be concave so that the fluid is introduced thereinto.

The fluid with a predetermined pressure passes through a fluid passage hole and a fluid inlet hole of the packing support 40 and is introduced into the fluid pressure groove 321, and when the second packing member 31 receives an applied pressure at a front side that is a direction that opposes a movement direction of the first packing member 31, the second packing member 31 is moved.

Meanwhile, the first packing member 31 and the second packing member 32 respectively include a first swash cam surface 312 and a second swash cam surface 322 that are formed to be inclined at contact surfaces thereof to correspond to each other.

Therefore, when the pipe P is inserted into the first packing member 31 by an external force, the pipe P is caught by the pipe locking protrusion 311, and the first packing member 31 is moved with the pipe P toward the rear side of the hollow. When the fluid in the coupler main body 10 passes through the fluid passage hole 41 and the fluid inlet hole 42 of the packing support 40 and is introduced into the fluid pressure groove 321 so that the second packing member 32 is moved toward the front side of the hollow by a pressure of the introduced fluid, the first packing member 31 and the second packing member 32 interact with each other by the first swash cam surface 312 and the second swash cam surface 322, the first packing member 31 is contracted so that an inner side thereof is pressed against the pipe P, and the second packing member 32 is expanded so that an outer surface thereof is pressed against the coupler main body 10, and thus water-tightness or airtightness can be firmly secured.

Meanwhile, a hollow cylindrical packing inner diameter-maintaining ring 313 is fastened to an inner surface of a part of a lower end portion of the first packing member 31 so that an inner diameter d shown in FIG. 3A is maintained even when the first packing member 31 is contracted by an interaction of the first swash cam surface 312 and the second swash cam surface 322.

That is, in a process in which the first packing member 31 is contracted and the second packing member 32 is expanded by an interaction of the first swash cam surface 312 and the second swash cam surface 322, since a lower end portion of the first packing member 31 is bent inward due to a pressure between the first swash cam surface 312 and the second swash cam surface 322, the airtightness of the second packing member 32 may be degraded. However, since the packing inner diameter-maintaining ring 313 prevents the lower end portion of the first packing member 31 from being bent, watertightness or airtightness can be firmly secured.

The packing support 40 is provided in the hollow of the coupler main body 10 and supports a rear end portion of the second packing member 32 to prevent the second packing member 32 from moving toward the rear side of the hollow.

In one embodiment of the present invention, the packing support 40 includes a fluid passage hole 41 formed in the center thereof and through which a fluid passes and a plurality of fluid inlet holes 42 formed in a surface on which the second packing member 32 is supported, wherein the fluid inlet holes 42 communicate with the fluid passage hole 41.

Therefore, the fluid in the coupling main body 10 passes through the fluid passage hole 41 and the fluid inlet holes 42 and is introduced into the fluid pressure groove 321, and thus the second packing member 31 moves toward the front side of the hollow due to a pressure of the fluid.

The grip ring support 50 is provided in front of the grip ring 20 in the hollow of the coupler main body 10 and includes a ring support part 51 and a radial piece support part 52.

The ring support part 51 is annularly formed and supports the ring part 21 of the grip ring 20.

The radial piece support part 52 has a shape that is bent from the ring support part 51 toward the rear side of the hollow to correspond to an inclination of the radial piece 22 of the grip ring 20.

Even when an external force is applied in a direction in which the pipe P comes out (toward the front side of the hollow) in a state in which the pipe P is inserted into the grip ring 20, the radial piece support part 52 prevents the radial pieces 22 of the grip ring 20 from being bent toward the front side of the hollow, and thus damage to the pipe P when the radial piece 22 excessively digs into the pipe P can be prevented.

The pipe insertion guide 60 is provided in the hollow of the coupling main body 10, is positioned between the grip ring 20 and the packing member 30 to allow the pipe P to be inserted thereinto, has a predetermined inner diameter corresponding to an outer diameter of the pipe P, and guides the insertion movement of the pipe P.

The pipe insertion guide 60 guides the pipe P that passes through the grip ring 20 to allow the pipe P to be easily inserted into the packing member 30.

FIGS. 5 and 6 are cross-sectional views illustrating a use state of the pipe coupler having a function of covering a pipe according to one embodiment of the present invention. When the pipe P is inserted into the hollow 11 of the coupler main body 10 as shown in FIG. 6 from the initial state of FIG. 5, the radial pieces 22 of the grip ring 20 are bent toward the rear side of the hollow to allow the pipe P to be inserted thereinto and prevent the inserted pipe P from coming out, and thus the pipe P is fixed in an one-touch manner.

Further, as shown in FIG. 6, when the pipe P is inserted by an external force and is caught by the pipe locking protrusion 311, the first packing member 31 is moved with the pipe P toward the rear side of the hollow, a fluid in the coupler main body 10 passes through the fluid passage hole 41 and the fluid inlet holes 42 of the packing support 40 and is introduced into the fluid pressure groove 321, and the second packing member 32 is moved by a pressure of the fluid toward the front side of the hollow.

When the first packing member 31 is moved toward the rear side of the hollow and the second packing member 32 is moved toward the front side of the hollow, the first packing member 31 and the second packing member 32 interact with each other by the first swash cam surface 312 and the second swash cam surface 322. The first packing member 31 is contracted so that an inner surface thereof is pressed against the pipe P, and the second packing member 32 is expanded so that an outer surface thereof is pressed against the coupler main body 10, and thus sealing performance of the packing member 30 can be remarkably increased.

The pipe coupler having a function of covering a pipe described above and illustrated in the drawings are only exemplary examples of the present invention, and it should not be construed as limiting the scope of the present invention. The scope of the present invention is defined only by the description disclosed in the claims, and embodiments that are modified and changed without departing from the scope of the invention are within the scope of the invention as long as it is obvious to those skilled in the art.

INDUSTRIAL APPLICABILITY

The present invention having the above-described configuration can prevent a coating layer of a front end portion of a pipe, which is connected to a pipe coupler, from peeling off, can allow even a pipe, which has a non-smooth and grooved outer circumferential surface, to be sealed, and can more firmly maintain watertightness and airtightness.

What is claimed is:
1. A pipe coupler which connects pipes, in which a fluid with a predetermined pressure moves while maintaining watertightness or airtightness, the pipe coupler comprising:
a coupler main body having a hollow formed in a length direction thereof and configured to communicates with the pipe, wherein the pipe is inserted into a front side of the hollow;
a grip ring provided in the hollow of the coupler main body and configured to fix the pipe so as to allow the pipe to be inserted thereinto and prevent the inserted pipe from coming out; and
a packing member provided in the hollow of the coupler main body, and configured to seal a gap between the coupler main body and the pipe when the pipe is inserted into the packing member,
wherein the packing member includes a pipe locking protrusion protruding inward from an inner surface of a lower end portion thereof so that a front end portion of the pipe inserted into the packing member is surrounded and covered, and
wherein the packing member includes a first packing member having the pipe locking protrusion formed thereon and an inner surface which is in contact with the pipe and a second packing member having an inner surface which is in contact with an outer surface of the first packing member and an outer surface which is in contact with the coupler main body,
a packing support that is provided in the hollow of the coupler main body, has a fluid passage hole formed in the center thereof so that the fluid passes therethrough, and supports a rear end portion of the second packing member so as to prevent the second packing member from moving toward a rear side of the hollow is further included,
the first packing member and the second packing member respectively include a first swash cam surface and a second swash cam surface formed to be inclined at contact surfaces thereof to correspond to each other, and thus, when the pipe is inserted into the first packing member by an external force and is caught by the pipe locking protrusion so that the first packing member is moved with the pipe toward the rear side of the hollow, the first packing member is contracted so that an inner surface thereof is pressed against the pipe and the second packing member is expanded so that an outer surface thereof is pressed against the coupler main body.

2. The pipe coupler of claim 1, wherein the packing support includes a plurality of fluid inlet holes formed in a surface, on which the second packing member is supported so that the second packing member is moved toward the front side of the hollow by a pressure of a fluid in the coupler main body, and configured to communicate with the fluid passage hole.

3. The pipe coupler of claim 2, wherein the second packing member includes a fluid pressure groove which is formed in a rear end portion supported on the packing support and is concave so that the fluid is introduced thereinto.

4. The pipe coupler of claim 1, wherein a packing inner diameter-maintaining ring having a hollow cylindrical shape is fastened to an inner surface of a lower end portion of the first packing member so that an initial inner diameter of a part of the lower end portion of the first packing member is maintained even when the first packing member is contracted.

5. The pipe coupler of claim 1, wherein the grip ring includes a ring part, which is annular and allows the pipe to pass through the center thereof, and a plurality of radial pieces disposed to be inclined from the ring part in a direction, in which an inner diameter is decreased toward the rear side of the hollow, to allow the pipe to be inserted but not to come out toward the front side of the hollow, and a grip ring support provided in the hollow of the coupler main body, positioned in front of the grip ring, and including a ring support part which supports the ring part of the grip ring and a radial piece support part which is bent from the ring support part toward the rear side of the hollow to correspond to an inclination of the radial piece of the grip ring so as to prevent the radial piece of the grip ring from being bent toward the front side of the hollow is further included.

6. The pipe coupler of claim 1, further comprising a pipe insertion guide which is provided in the hollow of the coupler main body, is positioned between the grip ring and the packing member so that the pipe is inserted thereinto, has a predetermined inner diameter corresponding to an outer diameter of the pipe, and guides the insertion movement of the pipe.

* * * * *